United States Patent
Souers

(10) Patent No.: US 11,635,128 B2
(45) Date of Patent: Apr. 25, 2023

(54) TORQUE CONVERTER WITH RIVET CONNECTED STACKED PLATES FOR A LOCK-UP CLUTCH

(71) Applicant: Schaeffler Technologies AG & Co. KG, Herzogenaurach (DE)

(72) Inventor: Long Souers, Nonth Canton, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/205,200

(22) Filed: Mar. 18, 2021

(65) Prior Publication Data
US 2022/0299094 A1 Sep. 22, 2022

(51) Int. Cl.
*F16H 45/02* (2006.01)

(52) U.S. Cl.
CPC ....... *F16H 45/02* (2013.01); *F16H 2045/021* (2013.01); *F16H 2045/0205* (2013.01); *F16H 2045/0215* (2013.01); *F16H 2045/0221* (2013.01); *F16H 2045/0284* (2013.01); *F16H 2045/0294* (2013.01)

(58) Field of Classification Search
CPC ... F16H 45/02; F16H 2045/0205–0215; F16H 2045/0273–0294
See application file for complete search history.

(56) References Cited

U.S. PATENT DOCUMENTS

| | | | | |
|---|---|---|---|---|
| 7,036,643 | B2* | 5/2006 | Back | F16H 45/02 192/3.3 |
| 7,077,253 | B2* | 7/2006 | Maienschein | F16H 45/02 192/3.3 |
| 8,261,900 | B2* | 9/2012 | Degler | F16D 13/69 192/3.3 |
| 2011/0240432 | A1* | 10/2011 | Takikawa | F16H 45/02 192/3.29 |
| 2019/0136951 | A1 | 5/2019 | Vanni et al. | |
| 2020/0370631 | A1* | 11/2020 | Nelson | F16H 45/02 |
| 2020/0393029 | A1 | 12/2020 | Nelson et al. | |
| 2021/0215239 | A1* | 7/2021 | Furuya | F16H 45/02 |

* cited by examiner

*Primary Examiner* — Ernesto A Suarez
*Assistant Examiner* — James J Taylor, II
(74) *Attorney, Agent, or Firm* — Volpe Koenig, P.C.

(57) ABSTRACT

A torque converter, including: a cover arranged to receive torque; an impeller; a turbine; a stator; and a lock-up clutch including a piston plate, a first plate, a second plate axially disposed between the cover and the first plate, and a rivet non-rotatably connecting the first plate to the second plate, the rivet being a component distinct from the first plate and the second plate. The cover and the piston plate define at least a portion of a first pressure chamber. The first plate and the second plate define at least a portion of a second pressure chamber. The first pressure chamber and the second pressure chamber are arranged to receive and expel a fluid to axially displace the piston plate to open and close the lock-up clutch.

13 Claims, 8 Drawing Sheets

TORQUE CONVERTER WITH RIVET CONNECTED STACKED PLATES FOR A LOCK-UP CLUTCH

TECHNICAL FIELD

The present disclosure relates to a torque converter with rivet connected stacked plates for a lock-up clutch.

BACKGROUND

Known torque converters use welds to non-rotatably connect plates forming pressure chambers. Welding operations can result in splatter residue in the torque converter, which degrades the durability and service life of the torque converter. Welded plates forming pressure chambers for known torque converters must be shaped to create channels between welds for fluid transfer. The shaping increases the cost and complexity of fabricating the plates.

SUMMARY

According to aspects illustrated herein, there is provided a torque converter, including: a cover arranged to receive torque; an impeller including an impeller shell fixed to the cover, and at least one impeller blade fixed to the impeller shell; a turbine including a turbine shell, and at least one turbine blade fixed to the turbine shell; a stator including at least one stator blade axially disposed between the impeller shell and the turbine shell; and a lock-up clutch including a piston plate, a first plate, a second plate axially disposed between the cover and the first plate, and a rivet non-rotatably connecting the first plate to the second plate, the rivet being a component distinct from the first plate and the second plate. The cover and the piston plate define at least a portion of a first pressure chamber. The first plate and the second plate define at least a portion of a second pressure chamber. The first pressure chamber and the second pressure chamber are arranged to receive and expel a fluid to axially displace the piston plate to open and close the lock-up clutch.

According to aspects illustrated herein, there is provided a torque converter, including: a cover arranged to receive torque; an impeller including an impeller shell fixed to the cover, and at least one impeller blade fixed to the impeller shell; a turbine including a turbine shell, and at least one turbine blade fixed to the turbine shell; a stator including at least one stator blade axially disposed between the impeller shell and the turbine shell; and a lock-up clutch including a piston plate, a first plate, a second plate axially disposed between the cover and the first plate, and a rivet non-rotatably connecting the first plate to the second plate, the rivet being integral to one of the first plate and the second plate. The cover and the piston plate define, at least in part, a first pressure chamber. The piston plate and the first plate define, at least in part, a second pressure chamber. The rivet does not define a through-bore open to the first pressure chamber.

According to aspects illustrated herein, there is provided a method of operating a torque converter including a cover, an impeller shell, a turbine shell, an output element arranged to non-rotatably connect to a transmission input shaft, and a lock-up clutch including a piston plate, a first plate, a second plate free of contact with the first plate, and a rivet non-rotatably connecting the first plate and the second plate, the rivet being a component distinct from the first plate and the second plate. The method includes: in a lock-up mode of the torque converter: receiving, with the cover, a rotational torque, transmitting the rotational torque to the output element via the lock-up clutch, and flowing a first pressurized fluid through a first pressure chamber defined at least in part by the second plate and the cover; to transition to a torque converter mode of the torque converter: flowing a second pressurized fluid into a second pressure chamber at least partly defined by the cover and the piston plate, flowing, between the second plate and the first plate, a third pressurized fluid out of a third pressure chamber at least partly defined by the first plate, the second plate, and the piston plate, displacing, with the second pressurized fluid, the piston plate in a first axial direction parallel to an axis of rotation of the torque converter, opening the lock-up clutch, and transmitting the torque to the output element via the impeller and the turbine; and to transition to the lock-up mode of the torque converter: flowing the second pressurized fluid out of the second pressure chamber, flowing, between the first plate and the second plate, the third pressurized fluid into the third pressure chamber, displacing, with the third pressurized fluid, the piston plate in a second axial direction opposite the first axial direction, closing the lock-up clutch, and transmitting the torque to the output element via the lock-up clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
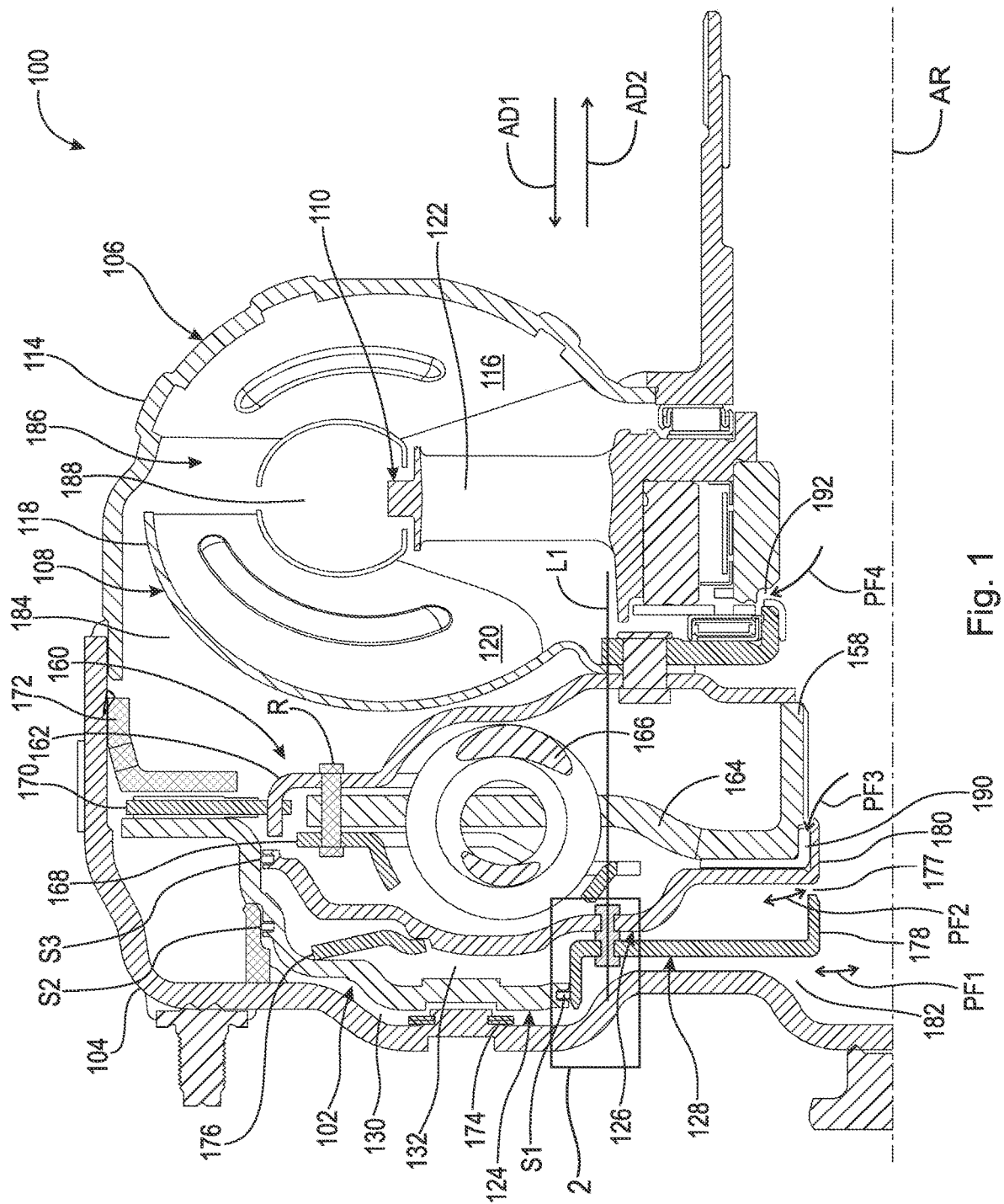
FIG. 1 is a cross-sectional view of an example four-pass torque converter with a lock-up clutch including a non-integral rivet.

FIG. 1 is a cross-sectional view of example four-pass torque converter 100 with a lock-up clutch including a non-integral rivet. Stacked plate four-pass torque converter 100 includes: lock-up clutch 102; cover 104 arranged to receive torque; impeller 106; turbine 108; stator 110; and rivet 112. Impeller 106 includes impeller shell 114 fixed to cover 104 and at least one impeller blade 116 fixed to impeller shell 114. Turbine 108 includes turbine shell 118 and at least one turbine blade 120 fixed to turbine shell 118. Stator 110 includes at least one stator blade 122 axially disposed between impeller shell 114 and turbine shell 118. Torque converter 100 is not limited to a particular number of non-integral rivets 112.

Lock-up clutch 102 includes: piston plate 124 non-rotatably connected to cover 104; dam plate 126; and centering plate 128 axially disposed between cover 104 and dam plate 126. Apply pressure chamber 130 is at least partly defined by cover 104, centering plate 128, and piston plate 124. Release pressure chamber 132 is at least partly defined by piston plate 124, dam plate 126, and centering plate 128. Rivet 112 non-rotatably connects dam plate 126 and centering plate 128. In the example of FIG. 1, dam plate 126 is free of contact with centering plate 128.

In the example of FIG. 1, rivet 112 is non-integral with respect to dam plate 126 and centering plate 128. By a component being "non-integral" with respect to one or more other components, we mean the component: is distinct from the one or more other components; is separately formed from the one or more other components; and is placed into contact with the one or more other components as part of the assembly of a device including the components. In the example of FIG. 1, rivet 112 passes through apply pressure chamber 132.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 2:
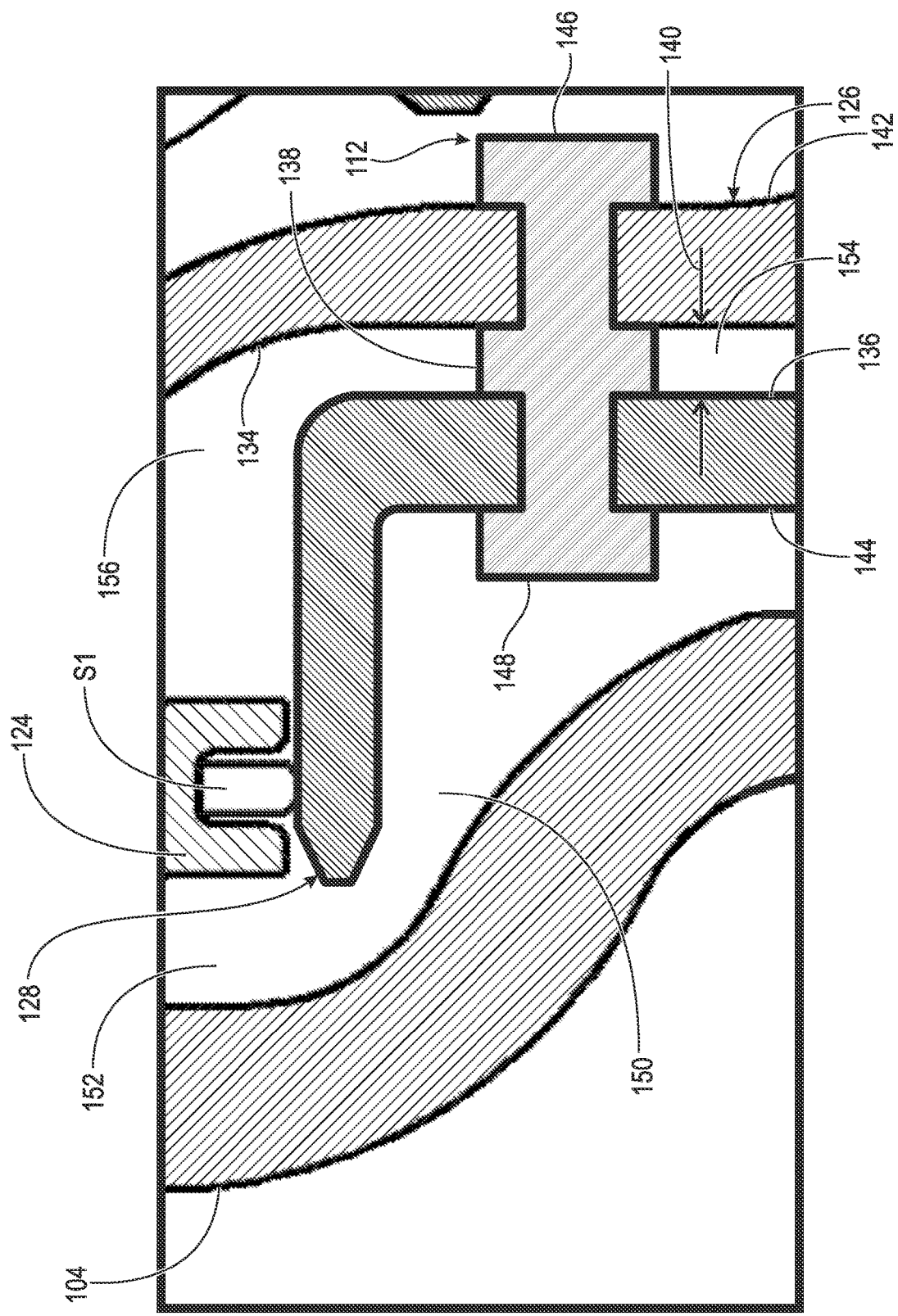
FIG. 2 is a detail of area 2 in FIG. 1.

FIG. 2 is a detail of area 2 in FIG. 1. The following should be viewed in light of FIGS. 1 and 2. In the example of FIG. 2, rivet 112 passes through dam plate 126 and centering plate 128. Dam plate 126 includes surface 134 facing centering plate 128 in axial direction AD1, parallel to axis of rotation AR of torque converter 100. Centering plate 128 includes surface 136 facing dam plate 126 in axial direction AD2, opposite direction AD1. Rivet 112 includes portion 138 axially disposed between centering plate 128 and dam plate 126. In the example of FIG. 2, portion 138 is in contact with surfaces 134 and 136 and axially separates dam plate 126 and centering plate 128 by gap 140 in direction AD1. Straight line L1, in axial direction AD2, passes through, in sequence, cover 104, rivet 112, and turbine shell 118 without passing through centering plate 128 or dam plate 126. In the example of FIG. 1, gap 140 is circumferentially continuous and has a uniform axial extent in direction AD1.

Dam plate 126 includes surface 142 facing in axial direction AD2 and centering plate 128 includes surface 144 facing in axial direction AD1. In the example of FIG. 2, rivet 112 includes: at least one portion 146 in contact with surface 142 and extending past surface 142 in direction AD2; and at least one portion 148 in contact with surface 144 and extending past surface 144 in direction AD1.

Cover 104 defines, in axial direction AD1, portion 150 of chamber 130. Centering plate 126 defines, in axial direction AD2, portion 150. Cover 104 defines, in axial direction AD1, portion 152 of chamber 130, radially outward of portion 150. Piston plate 124 defines, in axial direction AD2, portion 152.

Centering plate 128 defines, in axial direction AD1, portion 154 of chamber 132. Dam plate 126 defines, in direction AD2, portion 154. Piston plate 124 defines, in axial direction AD1, portion 156 of chamber 132, radially outward of portion 154. Dam plate 126 defines, in axial direction AD2, portion 156.

Torque converter 100 includes output element 158 arranged to non-rotatably connect to a transmission input shaft (not shown). In a torque converter mode of torque converter 100: cover 104 is arranged to receive rotational torque; clutch 102 is open; and the torque is transmitted to output element 158 via impeller 106 and turbine 108. In a lock-up mode of torque converter 100: cover 104 is arranged to receive rotation torque; clutch 102 is closed; and the torque is transmitted to output element 158 via clutch 102.

In the example of FIG. 1, torque converter 100 includes torsional vibration damper 160 including: input plate 162; output flange 164 arranged to non-rotatably connect to the input shaft and including output element 158; at least one spring 166 engaged with input plate 162 and output flange 164; and cover plate 168 engaged with springs 166 and non-rotatably connected to input plate 162, for example by rivets R. In an example embodiment, clutch 102 includes clutch plate 170 non-rotatably connected to input plate 162, and reaction plate 172 fixed to cover 104.

In the example of FIG. 1, torque converter 100 includes: leaf springs 174 non-rotatably connecting piston plate 124 to cover 104; and resilient element 176, for example a Belleville washer. Resilient element 176 is in contact with dam plate 126 and piston plate 124 and urges piston plate 124 in axial direction AD1. Leaf springs 174 enable piston plate 124 to axially displace with respect to cover 104 while remaining rotationally fixed to cover 104.

Chambers 130 and 132 are arranged to receive and expel pressurized fluid to control axial displacement of piston plate 124. To transition from the torque converter mode to the lock-up mode: pressurized fluid PF2 in chamber 132 is drained or expelled from chamber 132 around rivet 112, and through opening 177 between radially innermost end 178 of centering plate 128 and radially innermost end 180 of dam plate 126; pressurized fluid PF1 is pumped into chamber 130 through opening 182 between cover 104 and end 178; and fluid PF1 in chamber 130 displaces piston plate 124 in direction AD2 to close clutch 102 by non-rotatably connecting piston plate 124 and input plate 162 via clutch plate 170. The torque is transmitted: from cover 104, to piston plate 124; from piston plate 124 to input plate 162; and to output element 158 via springs 166 and flange 164.

To transition from the lock-up mode to the torque converter mode: pressurized fluid PF1 is drained or expelled from chamber 130 through opening 182; pressurized fluid PF2 is pumped through opening 177, into portion 154 of chamber 132, around rivet 112, and into portion 156 of chamber 132; and fluid PF2 in chamber 132 displaces piston plate 124 in direction AD1 to open clutch 102 by breaking the non-rotatable connection of piston plate 124 and input plate 162 via clutch plate 170.

In the example of FIG. 2: pressure chamber 184 is defined at least in part by dam plate 126, cover 104, and turbine shell 118; and pressure chamber 186 is defined by impeller shell 114 and turbine shell 118 and includes torus 188. With the exception of opening 182, chamber 130 is sealed from chambers 132, 184, and 186, for example by seals S1 and S2. With the exception of opening 177, chamber 132 is sealed from chambers 130, 184, and 186, for example by seals S1 and S3.

Chambers 130, 132, 184, and 186 are each separately and independently supplied with pressurized fluid via channels formed at least in part by the transmission input shaft and by a stator shaft (not shown) connected to stator 110. Chamber 130 is supplied with fluid PF1 through opening 182. Chamber 132 is supplied with fluid PF2 through opening 177. Chamber 184 is supplied with pressurized fluid PF3 through opening 190 between end 180 and output element 158. Chamber 186 is supply with pressurized fluid PF4 through opening 192 between turbine shell 118 and stator 110.

The following describes a method of operating torque converter 100 shown in FIGS. 1 and 2. Although the method is presented as a sequence of steps for clarity, no order should be inferred from the sequence unless explicitly stated. In a lock-up mode: a first step receives, with cover 104, a rotational torque; and a second step transmits the rotational torque to output element 158 via lock-up clutch 102. To transition to a torque converter mode: a third step flows pressurized fluid PF2 between plate 126 and plate 128 and through gap 140 into release pressure chamber 132; a fourth step flows pressurized fluid PF1 out of apply pressure chamber 130; a fifth step displaces, with pressurized fluid PF2, piston plate 124 in axial direction AD1; a sixth step opens lock-up clutch 102; a seventh step transmits the torque to output element 158 via impeller 106 and turbine 108. To transition to the lock-up mode from the torque converter mode: an eighth step flows pressurized fluid PF2 between plates 126 and 128 and through gap 140 out of release pressure chamber 132; and a ninth step flows pressurized fluid PF1 into apply pressure chamber 130; a tenth step displaces, with pressurized fluid PF1, plate 126 in axial direction AD2; an eleventh step closes lock-up clutch 102; and a twelfth step transmits the torque to output element 158 via lock-up clutch 102.

In the lock-up mode: a thirteenth step flows pressurized fluid PF3 through pressure chamber 184; and a fourteenth step flows pressurized fluid PF4 through pressure chamber 186.

Flowing pressurized fluid PF2, between plate 126 and plate 128 and through gap 140, out of release pressure chamber 132 includes flowing pressurized fluid PF2 around portion 138 of rivet 112. Flowing pressurized fluid PF2, between plate 126 and plate 128 and through gap 140, into release pressure chamber 132 includes flowing pressurized fluid PF2 around portion 138 of rivet 112. Flowing pressurized fluid PF3 through pressure chamber 184 includes flowing pressurized fluid PF3 through opening 190 between plate 126 and output hub 158. Flowing pressurized fluid PF4 through pressure chamber 186 includes flowing pressurized fluid PF4 through opening 192 between turbine shell 118 and stator 110.

Rivet 112 of torque converter 100 shown in FIGS. 1 and 2 eliminates the need for a weld to non-rotatably connect dam plate 126 and centering plate 128, which in turn eliminates potential problems associated with splatter contamination from the welding. In addition, portion 138 of rivet 112 creates gap 140. Gap 140 eliminates the need to form channels between welds to enable pressurized fluid PF2 to flow into and out of release pressure chamber 132. Thus, in the example of FIG. 1, surface 134 of dam plate 126 and surface 136 of centering plate 128 are substantially planar shapes, reducing the cost and complexity of fabricating plates 126 and 128.

Figure 3:
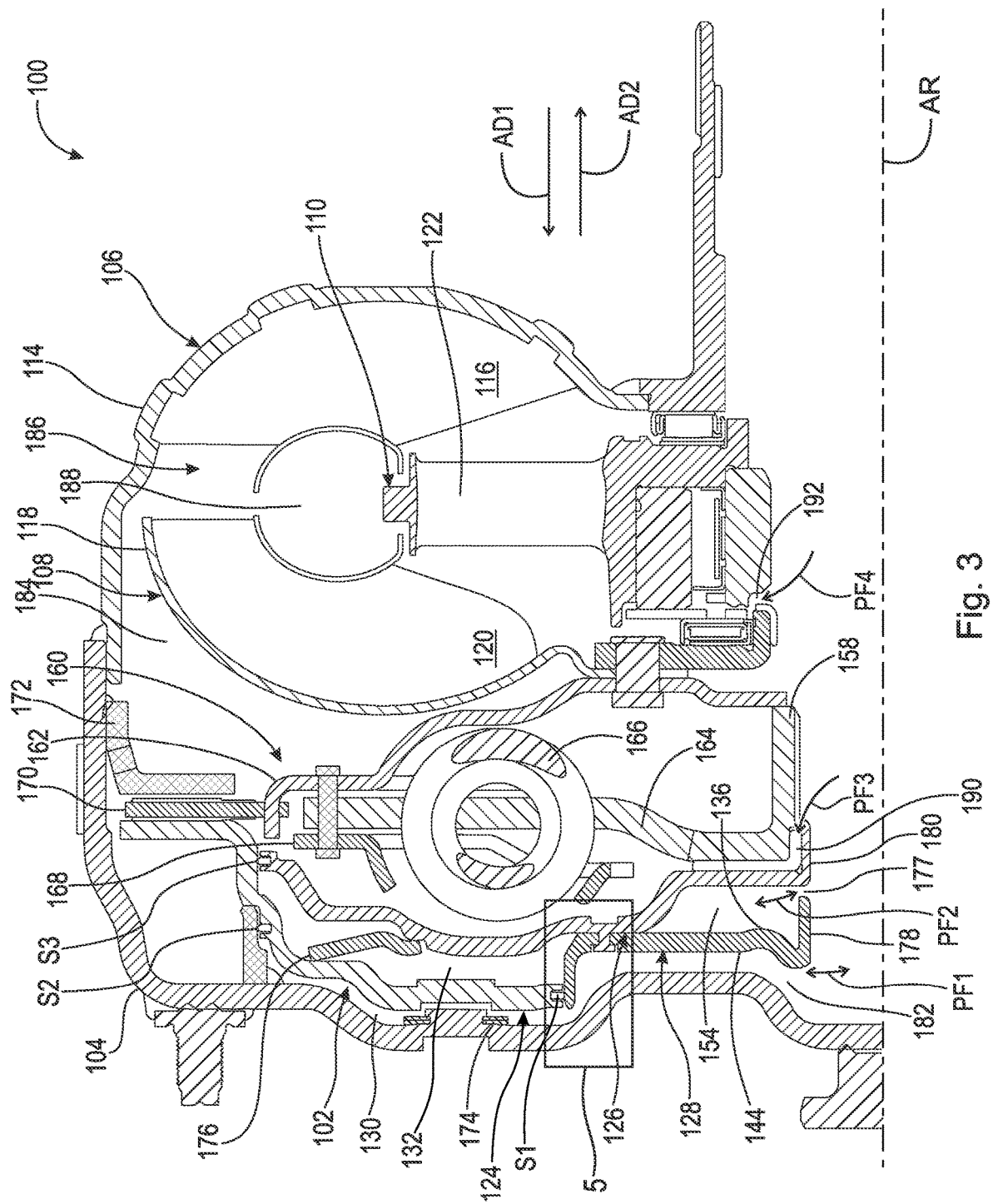
FIG. 3 is a cross-sectional view of an example four-pass torque converter with a lock-up clutch including an extruded rivet.

FIG. 3 is a radial cross-sectional view of example four-pass torque converter 100 with lock-up clutch 102 including an extruded rivet 112.

Figure 4:
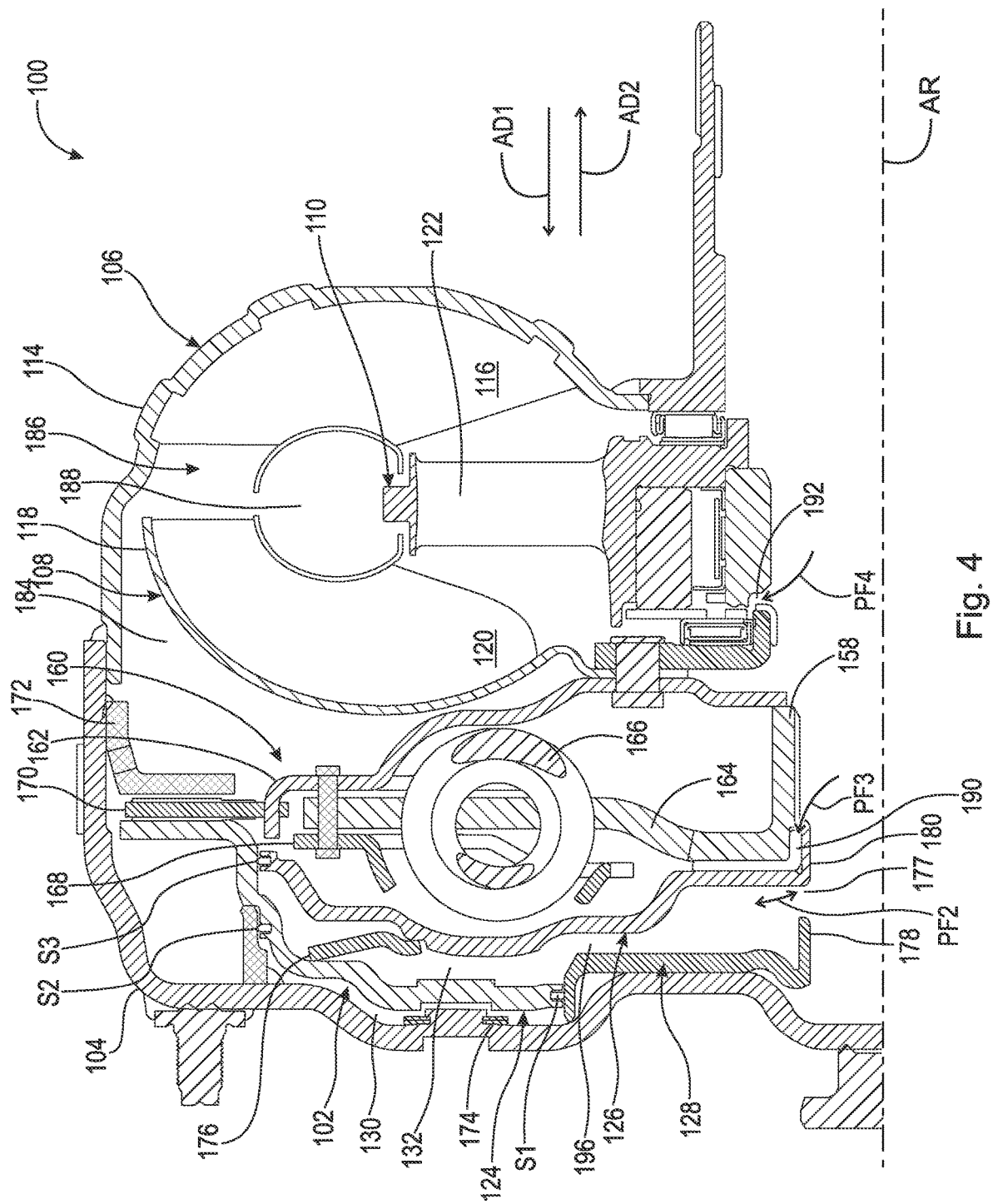
FIG. 4 is a circumferentially off-set cross-sectional view of the example four-pass torque converter shown in FIG. 3.

FIG. 4 is a circumferentially off-set radial cross-sectional view of example four-pass torque converter 100 shown in FIG. 3.

Figure 5:
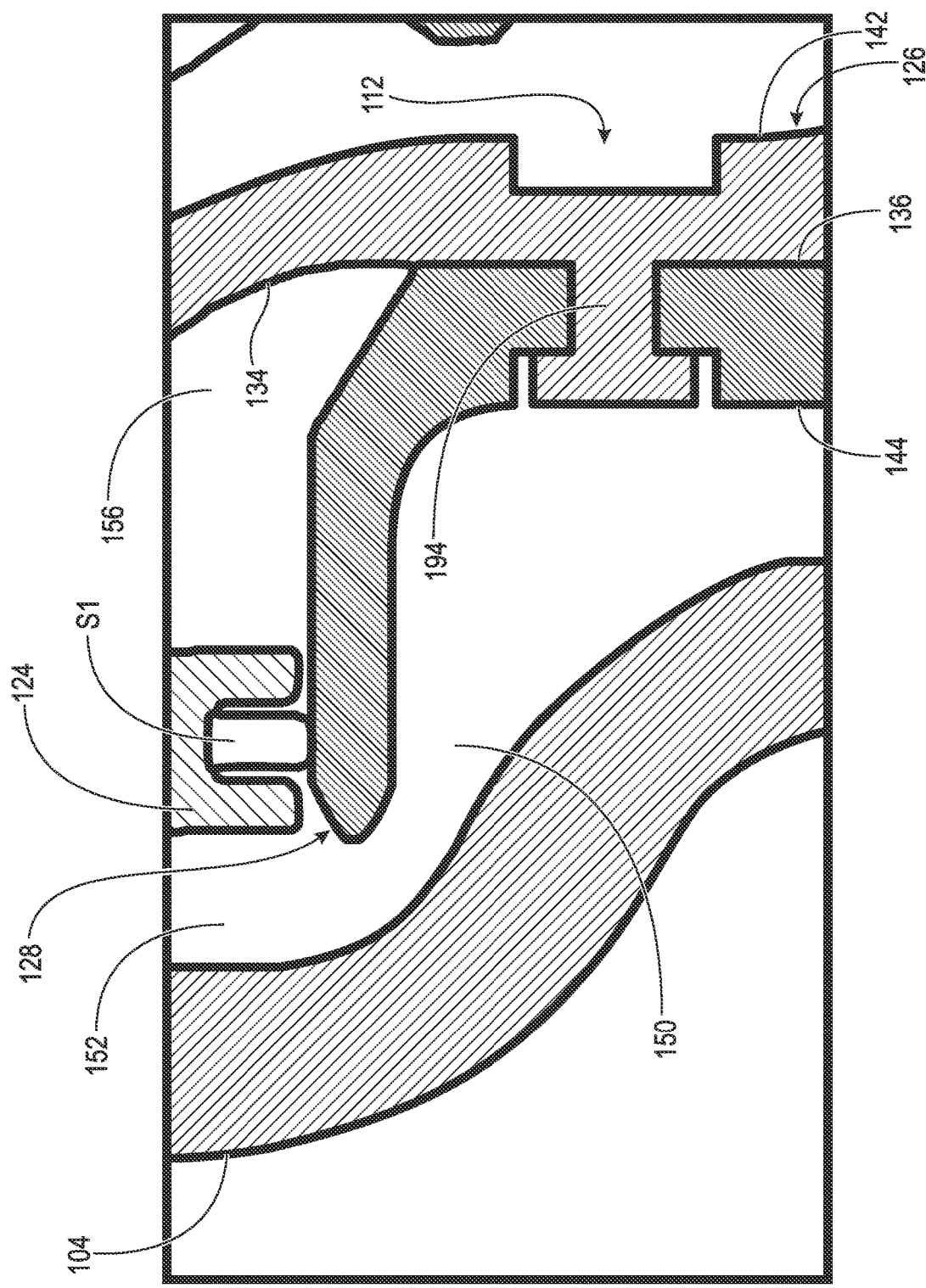
FIG. 5 is a detail of area 5 in FIG. 3.

FIG. 5 is a detail of area 5 in FIG. 3. The discussion for FIGS. 1 and 2 is applicable to FIGS. 3 through 5 except as noted. In the example of FIG. 3, extruded rivet 112 replaces separate rivet 112 shown in FIGS. 1 and 2. In the example of FIG. 3, extruded rivet 112 is integral to dam plate 126 and includes portion 194 passing through centering plate 128. Surfaces 134 and 136 are in contact proximate rivet 112. FIG. 4 shows channel 196: between dam plate 126 and centering plate 128, connecting portions 154 and 156 of chamber 132, and circumferentially aligned with rivet 112. Extruded rivets 112 and channels 196 are interleaved in a circumferential direction. Torque converter 100 is not limited to a particular number of extruded rivets 112. In an example embodiment not shown, rivet 112 is extruded from centering plate 128.

To transition from the torque converter mode to the lock-up mode: pressurized fluid PF1 in chamber 132 is drained or expelled from portion 156 of chamber 132, around portions of surfaces 134 and 136 in contact proximate rivet 112, through portion 154 of chamber 132, and through opening 177; pressurized fluid PF2 is pumped into chamber 130 through opening 182; and fluid PF2 in chamber 130 displaces piston plate 124 in direction AD2 to close clutch 102 by non-rotatably connecting piston plate 124 and input plate 162 via clutch plate 170. The torque is transmitted: from cover 104, to piston plate 124; from piston plate 124 to input plate 162; and to output element 158 via springs 166 and flange 164.

To transition from the lock-up mode to the torque converter mode: pressurized fluid PF1 is drained or expelled from chamber 130 through opening 182; pressurized fluid PF2 is pumped through opening 177, into portion 154 of chamber 132, around portions of surfaces 134 and 136 in contact proximate rivet 112, and into portion 156 of chamber 132; and fluid PF2 in chamber 132 displaces piston plate 124 in direction AD1 to open clutch 102 by breaking the non-rotatable connection between piston plate 124 and input plate 162 (via clutch plate 170). The torque is transmitted: from cover 104, through impeller 106 to turbine shell 118; from shell 118 to input plate 162; and to output element 158 via springs 166 and flange 164.

The following describes a method of fabricating portions of torque converter 100 shown in FIGS. 3 through 5. Although the method is presented as a sequence of steps for clarity, no order should be inferred from the sequence unless explicitly stated. A first step axially stacks centering plate 128 and piston plate 124 on cover 104. A second step stacks dam plate 126 on centering plate 128 and piston plate 124 to form channel 196. A third step extrudes a rivet from dam plate 126 through centering plate 128 to non-rotatably connect dam plate 126 to centering plate 128.

Rivet 112 of torque converter 100 shown in FIGS. 3 through 5 eliminates the need for a weld to non-rotatably connect dam plate 126 and centering plate 128, which in turn eliminates potential problems associated with splatter contamination from the welding.

Figure 6:
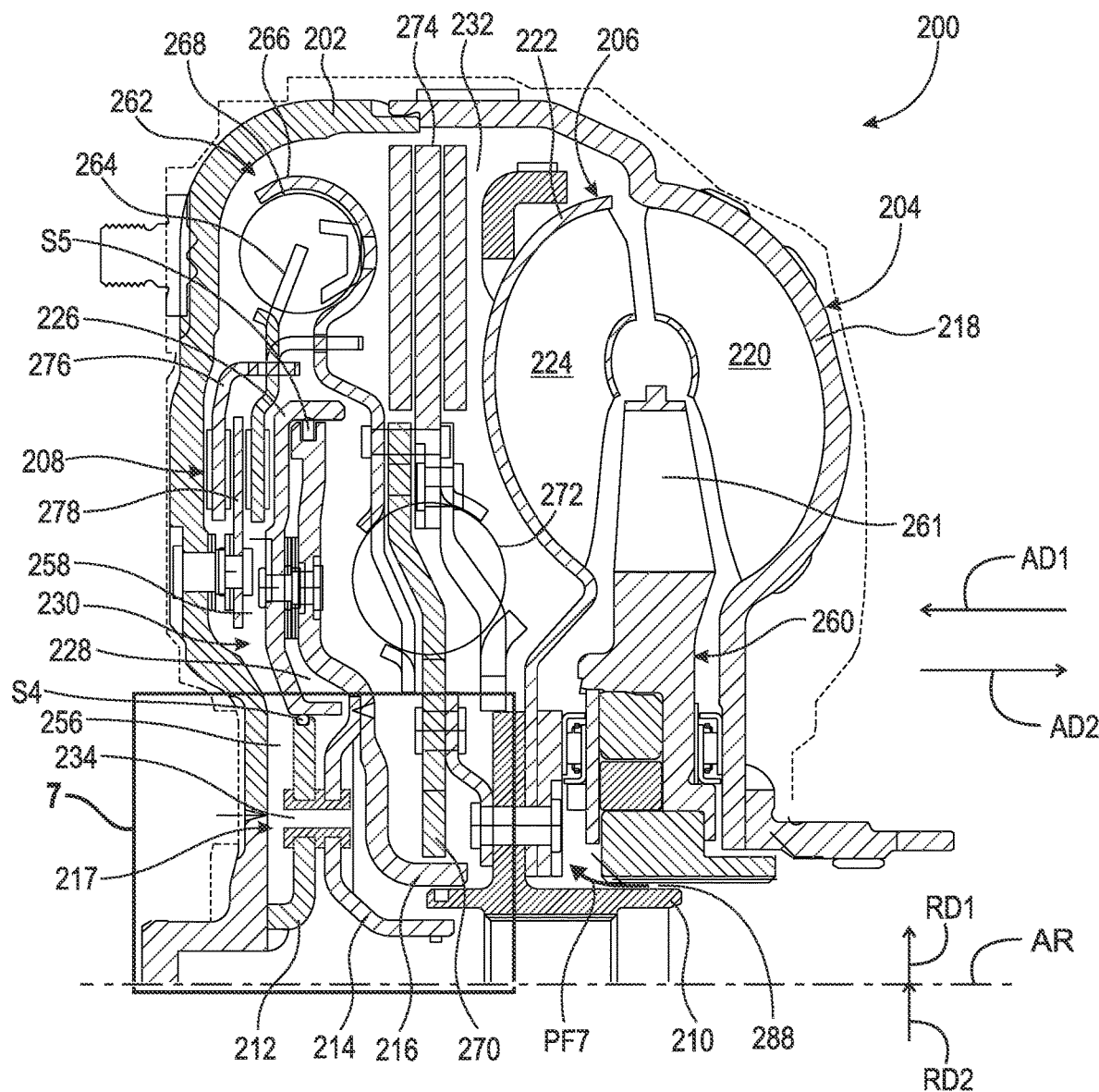
FIG. 6 is a cross-sectional view of an example three-pass torque converter with a lock-up clutch including a non-integral rivet with a through-bore.

FIG. 6 is a radial cross-sectional view of example three-pass torque converter 200 with a lock-up clutch including a non-integral rivet with a through-bore.

Figure 7:
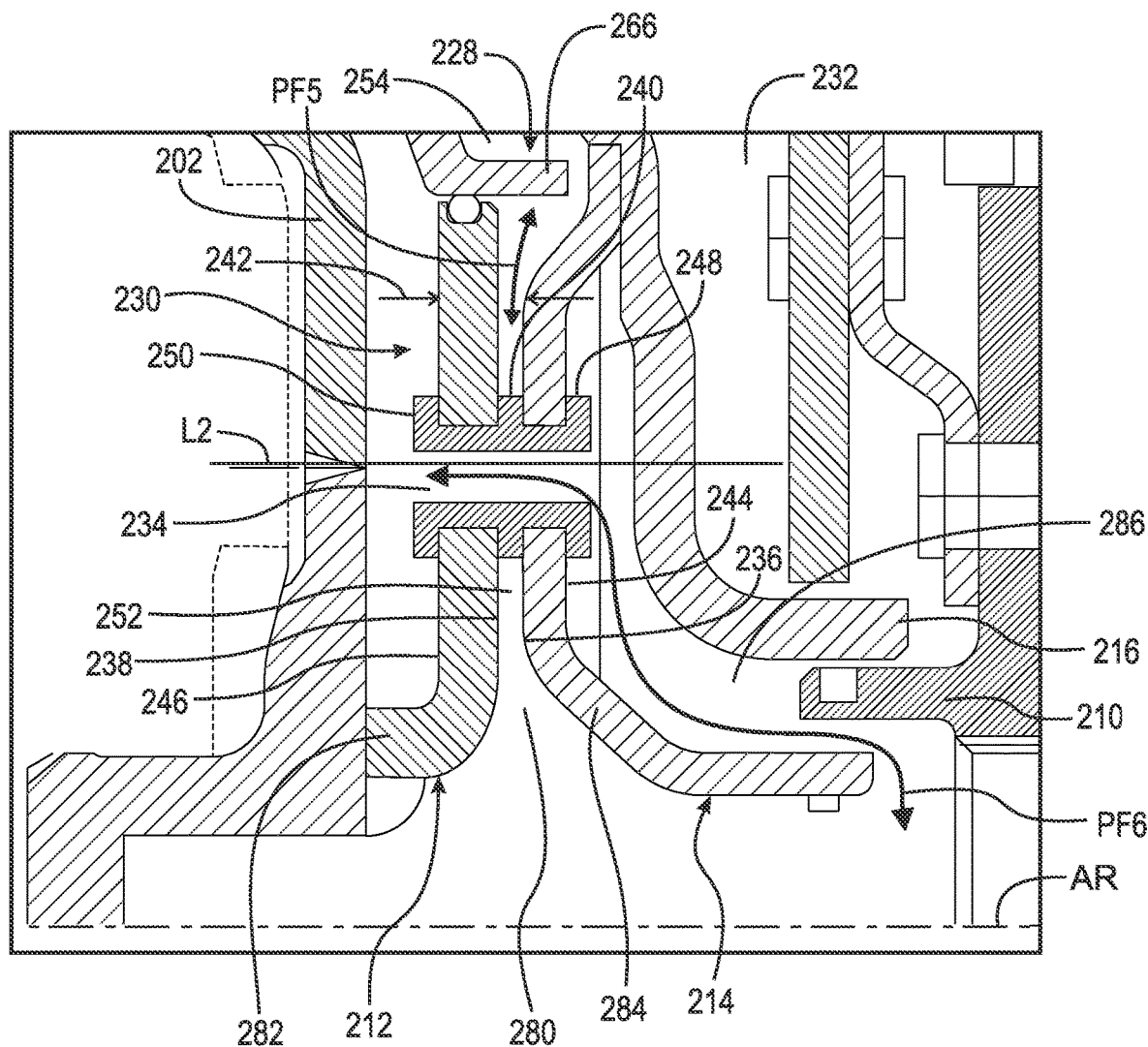
FIG. 7 is a detail of area 7 in FIG. 6.

FIG. 7 is a detail of area 7 in FIG. 6. The following should be viewed in light of FIGS. 6 and 7. Torque converter 200 includes: cover 202 arranged to receive rotational torque; impeller 204; turbine 206; lock up clutch 208; output hub 210 arranged to non-rotatably connect to a transmission input shaft (not shown). Lock up clutch 208 includes: plate 212; flow plate 214; backing plate 216; and rivet 217. Impeller 204 includes: impeller shell 218 non-rotatably connected to cover 202; and at least one impeller blade 220. Turbine 206 includes: turbine shell 222 non-rotatably connected to hub 210; and at least one turbine blade 224. Lock-up clutch 208 includes piston plate 226. Apply chamber 228 is defined, at least, at least in part, by plate 212, flow plate 214, backing plate 216, and piston plate 226. Release chamber 230 is defined, at least, in part, by cover 202, plate 212, and piston plate 226. Chamber 232 is defined, at least in part, by backing plate 216, cover 202, and impeller shell 218. Torque converter 200 is not limited to a particular number of non-integral rivets 217.

In the example of FIG. 6, rivet 217: is non-integral with respect to plate 212 and plate 214; and non-rotatably connects plate 212 and plate 214. In the example of FIG. 6, rivet 217 passes through apply chamber 228.

Rivet 217 defines through-bore 234. Line L2, parallel to axis of rotation AR of torque converter 200, passes through chamber 228, through-bore 234, and chamber 230 without passing through plate 212 or plate 214. By a "through-bore" defined by a component, we mean a passageway wholly enclosed by the component except at the two opposite ends of the passageway.

In the example of FIG. 6, rivet 217 passes through plate 212 and plate 214. Plate 214 includes surface 236 facing plate 212 in axial direction AD1. Plate 212 includes surface 238 facing plate 214 in axial direction AD2. Rivet 217 includes portion 240 axially disposed between plate 212 and plate 216 and located in pressure chamber 228. In the example of FIG. 6, portion 240 is in contact with surfaces 236 and 238 and axially separates plate 212 and plate 214 by gap 242 in direction AD1. In the example of FIG. 6, gap 242 is circumferentially continuous and has a uniform axial extent in direction AD1.

Plate 214 includes surface 244 facing in axial direction AD2 and plate 212 includes surface 246 facing in axial direction AD1. In the example of FIG. 6, rivet 217 includes: portion 248 in contact with surface 244 and extending past surface 244 in direction AD2; and portion 250 in contact with surface 246 and extending past surface 246 in direction AD1.

Plate 212, rivet 217, and plate 216 define portion 252 of chamber 228. Piston plate 226, plate 212, rivet 217, plate 214, and plate 216 define portion 254 of chamber 228, located radially outwardly of portion 252.

Cover 202 defines, in axial direction AD1, portion 256 of chamber 230. Plate 212 defines, in direction AD2, portion 256. Cover 202 defines, in axial direction AD1, portion 258 of chamber 230, radially outward of portion 256. Piston plate 226 defines, in axial direction AD2, portion 258.

In a torque converter mode of torque converter 200: cover 202 is arranged to receive rotation torque; clutch 208 is open; and the torque is transmitted to output hub 210 via impeller 204 and turbine 206. In a lock-up mode of torque converter 200: cover 202 is arranged to receive the rotation torque; clutch 208 is closed; and the torque is transmitted to output hub 210 via clutch 208.

In the example of FIG. 6, torque converter 200 includes stator 260 with at least one stator blade 261; and pendulum vibration damper 262. Damper 262 includes: input plate 264; drive plate/retainer plate 266; at least one spring 268 engaged with plate 264 and plate 266; output flange 270 non-rotatably connected to output hub 210; at least one spring 272 engaged with drive plate 266 and output flange 270; and pendulum damper 274. In an example embodiment, clutch 208 includes: clutch plate 276 non-rotatably connected to input plate 264; and clutch plate 278 non-rotatably connected to cover 202.

Chambers 228 and 230 are arranged to receive and expel pressurized fluid to control axial displacement of piston plate 226. To transition from the lock-up mode to the torque converter mode: pressurized fluid PF5 in chamber 228 is drained or expelled through opening 280 between radially innermost end 282 of plate 212 and radially innermost end 284 of plate 214; and pressurized fluid PF6 is pumped through channel 286, between end 284 and output hub 210, and through-bore 234 into chamber 230. Fluid PF6 in chamber 230 displaces piston plate 226 in direction AD2 to open clutch 208 by breaking the non-rotatable connection among piston plate 226, input plate 264, clutch plate 276, and clutch plate 278. The rotational torque is transmitted from cover 202, and through impeller 204 and turbine shell 222, to output hub 210.

To transition from the torque converter mode to the lock-up mode: pressurized fluid PF6 in chamber 230 is drained or expelled through through-bore 234 and channel 286; and fluid PF5 is pumped through opening 280 to portion 252 of chamber 228, gap 242, and portion 254 of chamber 228. Fluid PF5 in chamber 228 displaces piston plate 226 in direction AD1 to close clutch 208 by non-rotatably connecting piston plate 226, input plate 264, clutch plate 276, and clutch plate 278. Torque is transmitted: from cover 202, through clutch 208 and damper 262 to flange 270 and output hub 210.

In the example of FIG. 6, pressure chamber 232 is defined at least in part by plate 216, cover 202, and impeller shell 218. With the exception of opening 280, chamber 228 is sealed from chambers 230 and 232, for example by seals S4 and S5.

Chambers 228, 230, and 232 are each separately and independently supplied with pressurized fluid via channels formed at least in part by the transmission input shaft and by a stator shaft (not shown) non-rotatably connected to stator 260. Chamber 228 is supplied with fluid PF5 through opening 280. Chamber 230 is supplied with fluid PF6 through channel 286. Chamber 232 is supplied with fluid PF7 through opening 288 between output hub 210 and stator 260.

The following describes a method of operating torque converter 200 shown in FIGS. 6 and 7. Although the method is presented as a sequence of steps for clarity, no order should be inferred from the sequence unless explicitly stated. In the lock-up mode: a first step receives, with cover 202, a rotational torque; and a second step transmits the rotational torque to output element 210 via lock-up clutch 208. To transition from the lock-up mode to the torque converter mode: a third step flows pressurized fluid PF6 through channel 286 and through-bore 234 into release pressure chamber 230; a fourth step flows pressurized fluid PF5, between plate 212 and plate 214 and through gap 242, out of apply pressure chamber 228; a fifth step displaces, with pressurized fluid PF6, piston plate 226 in axial direction AD2; a sixth step opens lock-up clutch 208; a seventh step transmits the torque to output element 210 via impeller 204 and turbine 206. To transition from the torque converter mode to the lock-up mode: an eighth step flows pressurized fluid PF6 out of release pressure chamber 230 and through through-bore 234 and channel 286; and a ninth step flows, through opening 280, between plates 212 and 214, and through gap 242, pressurized fluid PF5 into apply pressure chamber 228; a tenth step displaces, with pressurized fluid PF5, piston plate 226 in axial direction AD1; an eleventh step closes lock-up clutch 208; and a twelfth step transmits the torque to output element 210 via lock-up clutch 208. In the lock-up mode: a thirteenth step flows pressurized fluid PF7 through pressure chamber 232.

Rivet 217 of torque converter 200 shown in FIGS. 6 and 7 eliminates the need for a weld to non-rotatably connect plate 212 and plate 214, which in turn eliminates potential problems associated with splatter contamination from the welding. In addition, portion 240 of rivet 217 creates gap 242. Gap 242 eliminates the need to form channels, between welds, to enable pressurized fluid to flow into and out of apply pressure chamber 228. Thus, in the example of FIG. 6, surface 236 of plate 214 and surface 238 of plate 212 are substantially simple planar shapes, reducing the cost and complexity of fabricating plates 212 and 214.

Figure 8A:
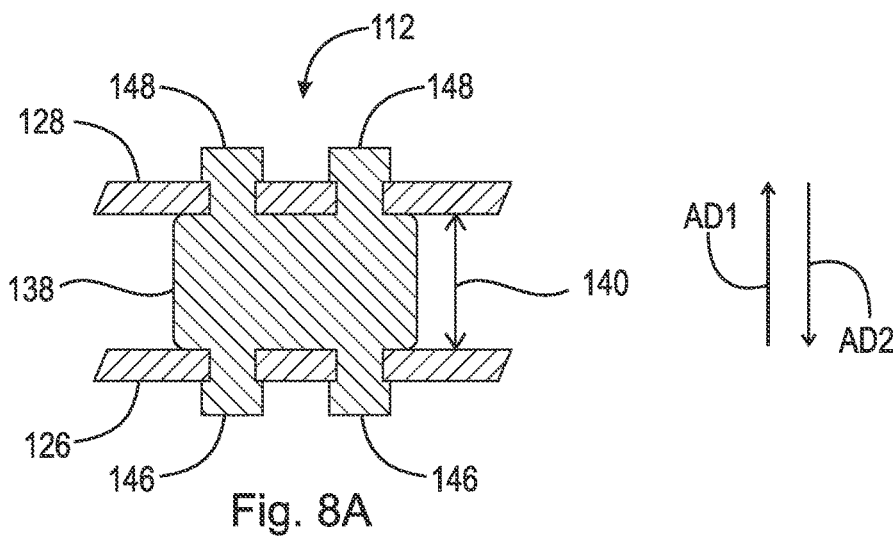
FIG. 8A is an axial cross-sectional view of an example non-integral rivet.

FIG. 8A is an axial cross-sectional view of an example non-integral rivet 112. In the example of FIG. 8A, rivet 112 includes two portions 146 and two portions 148.

Figure 8B:
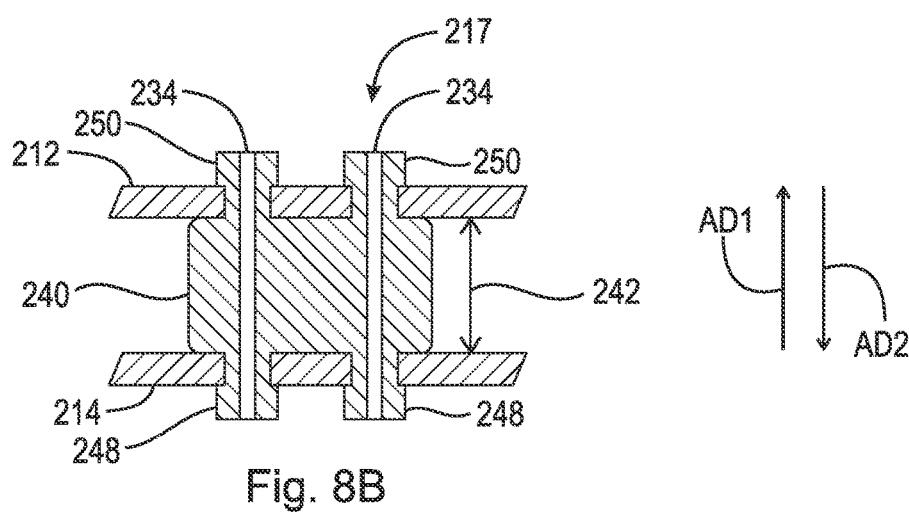
FIG. 8B is an axial cross-sectional view of an example non-integral rivet with two through-bores.

FIG. 8B is an axial cross-sectional view of example non-integral rivet 217 with two through-bores 234. In the example of FIG. 8B, rivet 217 has two through-bores 234, two portions 248, and two portions 250.

Figure 8C:
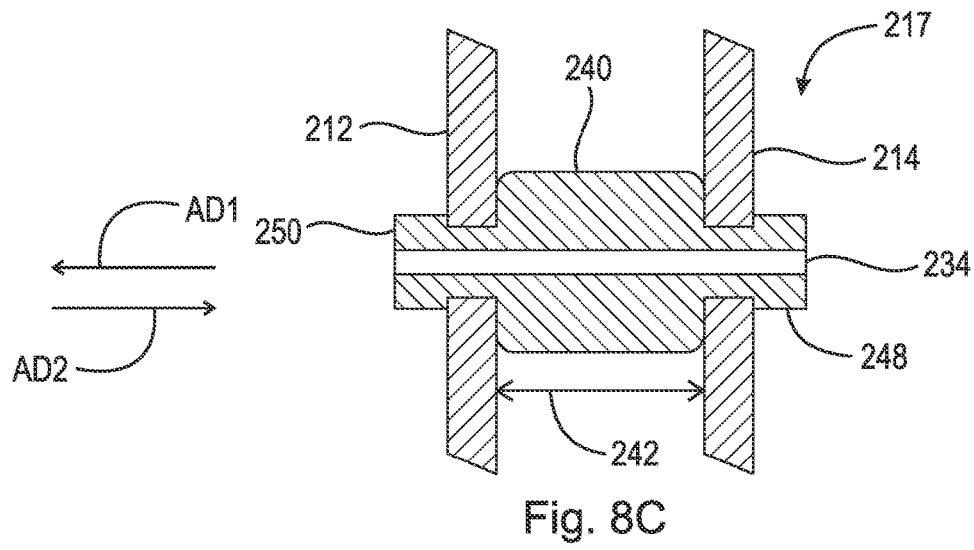
FIG. 8C is an axial cross-sectional view of an example non-integral rivet with one through-bore.

FIG. 8C is an axial cross-sectional view of example non-integral rivet 217 with one through-bore 234. In the example of FIG. 8C, rivet 217 has one through-bore 234, one portion 248, and one portion 250. It is understood that non-integral rivet 217 is not limited to a particular number of through-bores 234, portions 240, portions 248, or portions 250.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
L1 line
L2 line
PF1 pressurized fluid
PF2 pressurized fluid
PF3 pressurized fluid
PF4 pressurized fluid
PF5 pressurized fluid
PF6 pressurized fluid
PF7 pressurized fluid
R rivet
S1 seal
S2 seal
S3 seal
S4 seal
S5 seal
100 torque converter
102 lock-up clutch
104 cover
106 impeller
108 turbine
110 stator
112 rivet
114 impeller shell
116 impeller blade
118 turbine shell
120 turbine blade
122 stator blade
124 piston plate
126 dam plate
128 centering plate
130 apply pressure chamber
132 release pressure chamber
134 surface, dam plate
136 surface, centering plate
138 portion, rivet
140 gap
142 surface, dam plate
144 surface, centering plate
146 portion, rivet
148 portion, rivet
150 portion, apply pressure chamber
152 portion, apply release pressure chamber
154 portion, release pressure chamber
156 portion, release apply pressure chamber
158 output element
160 torsional vibration damper
162 input plate, damper
164 output flange, damper
166 spring, damper
168 cover plate, damper
170 clutch plate
172 reaction plate
174 leaf spring
176 resilient element
177 opening
178 radially innermost end, centering plate
180 radially innermost end, dam plate
182 opening
184 pressure chamber
186 pressure chamber
188 torus
190 opening
192 opening
194 portion, extruded rivet
196 channel
200 torque converter
202 cover
204 impeller
206 turbine
208 lock up clutch
210 output hub
212 plate 214 flow plate
216 backing plate
217 rivet
218 impeller shell
220 impeller blade
222 turbine shell
224 turbine blade
226 piston plate
228 apply pressure chamber
230 release pressure chamber
232 pressure chamber
234 through-bore
236 surface, plate 216
238 surface, plate 212
240 portion, rivet
242 gap
244 surface, plate 214
246 surface, plate 212
248 portion, rivet
250 portion, rivet
252 portion, chamber 228
254 portion, chamber 228
256 portion, chamber 230
258 portion, chamber 230
260 stator
261 stator blade
262 pendulum vibration damper
264 input plate
266 cover plate
268 spring
270 output flange
272 spring
274 pendulum damper
276 clutch plate
278 clutch plate
280 opening
282 radially innermost end, plate 212
284 radially innermost end, plate 214
286 channel
288 opening

The invention claimed is:

1. A torque converter, comprising:
a cover arranged to receive torque;
an impeller including an impeller shell fixed to the cover, and at least one impeller blade fixed to the impeller shell;
a turbine including a turbine shell, and at least one turbine blade fixed to the turbine shell;
a stator including at least one stator blade axially disposed between the impeller shell and the turbine shell; and,
a lock-up clutch including:
a piston plate;
a first plate;
a second plate axially disposed between the cover and the first plate and on which the piston plate is slidably displaced, the second plate being axially spaced from the cover and the first plate, such that the second plate is free from contact with the cover and the first plate; and,
a rivet non-rotatably connecting the first plate to the second plate, the rivet being a component distinct from the first plate and the second plate, wherein:
the cover and the piston plate define at least a portion of a first pressure chamber;
the first plate and the second plate define at least a portion of a second pressure chamber; and,
the first pressure chamber and the second pressure chamber are arranged to receive and expel a fluid to axially displace the piston plate to open and close the lock-up clutch.

2. The torque converter of claim 1, wherein a portion of the rivet is located in the first pressure chamber and in the second pressure chamber.

3. The torque converter of claim 1, wherein:
the first plate includes a first surface facing the second plate;
the second plate includes a second surface facing the first plate; and,
the rivet includes a portion:
axially disposed between the first plate and the second plate; and, in contact with the first surface and with the second surface.

4. The torque converter of claim 1, wherein a straight line, parallel to an axis of rotation of the torque converter passes through, in sequence, the cover, the rivet, and the turbine shell without passing through the first plate or the second plate.

5. The torque converter of claim 1, wherein the rivet defines a through-bore with a first end open to the first pressure chamber.

6. The torque converter of claim 5, wherein the first pressure chamber is arranged to receive a fluid via the through-bore to control an axial displacement of the piston plate.

7. The torque converter of claim 1, wherein:
the rivet includes:
a first axial end; and,
a second axial end opposite the first axial end;
the first axial end defines a first opening of a through-bore; and,
the second axial end defines a second opening of the through-bore.

8. The torque converter of claim 1, further comprising:
a third plate, wherein:
the third plate defines at least a portion of the second pressure chamber;
the rivet defines a through-bore;
the third plate, the cover, and the impeller shell define at least a portion of a third pressure chamber;
with an exception of an opening between a radially innermost end of the first plate and a radially innermost end of the second plate, the second pressure chamber is sealed from the first pressure chamber and the third pressure chamber;
the first pressure chamber is arranged to receive a first pressurized fluid, via the through-bore, to control an axial displacement of the piston plate;
the second pressure chamber is arranged to receive, between the radially innermost end of the first plate and the radially innermost end of the second plate, a second pressurized fluid to control the axial displacement of the piston plate; and,
the third pressure chamber is arranged to receive a third pressurized fluid through an opening between the impeller shell and the turbine shell.

9. The torque converter of claim 1, wherein:
the first plate, the cover, and the turbine shell define at least a portion of a third pressure chamber;
the impeller shell and the turbine shell define at least a portion of a fourth pressure chamber;
with an exception of an opening between the cover and a radially innermost end of the second plate, the first pressure chamber is sealed from the second pressure chamber, the third pressure chamber, and the fourth pressure chamber; and, with an exception of an opening between the radially innermost end of the second plate and a radially innermost end of the first plate, the second pressure chamber is sealed from the first pressure chamber, the third pressure chamber, and the fourth pressure chamber.

10. The torque converter of claim 1, wherein:

the cover defines, in a first axial direction parallel to an axis of rotation of the torque converter, a wall of a first portion of the first pressure chamber and a wall of a second portion of the first pressure chamber;

the second plate defines, in a second axial direction opposite the first axial direction, an opposite wall of the first portion of the first pressure chamber from the wall of the first portion of the first pressure chamber defined by the cover; and, the piston plate defines, in the second axial direction, an opposite wall of the second portion of the first pressure chamber from the wall of the second portion of the first pressure chamber defined by the cover.

11. The torque converter of claim 1, wherein:

the second plate defines, in a first axial direction parallel to an axis of rotation of the torque converter, a wall of a first portion of the second pressure chamber;

the first plate defines, in a second axial direction opposite the first axial direction, an opposite wall of the first portion of the second pressure chamber from the wall of the first portion of the second pressure chamber defined by the second plate; and, the piston plate defines, in the first axial direction, a second portion of the second pressure chamber.

12. A torque converter, comprising:

a cover arranged to receive torque;

an impeller including an impeller shell fixed to the cover, and at least one impeller blade fixed to the impeller shell;

a turbine including a turbine shell, and at least one turbine blade fixed to the turbine shell;

a stator including at least one stator blade axially disposed between the impeller shell and the turbine shell; and, a lock-up clutch including:

a piston plate;

a first plate;

a second plate axially disposed between the cover and the first plate and on which the piston plate is slidably displaced, the second plate being axially spaced from the cover and the first plate; and, a rivet non-rotatably connecting the first plate to the second plate, the rivet being a component distinct from the first plate and the second plate, wherein:

the cover and the piston plate define at least a portion of a first pressure chamber;

the first plate and the second plate define at least a portion of a second pressure chamber;

the first pressure chamber and the second pressure chamber are arranged to receive and expel a fluid to axially displace the piston plate to open and close the lock-up clutch; and, a portion of the rivet is located in the first pressure chamber and a portion of the rivet is located in the second pressure chamber.

13. A torque converter, comprising:

a cover arranged to receive torque;

an impeller including an impeller shell fixed to the cover, and at least one impeller blade fixed to the impeller shell;

a turbine including a turbine shell, and at least one turbine blade fixed to the turbine shell;

a stator including at least one stator blade axially disposed between the impeller shell and the turbine shell; and, a lock-up clutch including:

a piston plate;

a first plate;

a second plate axially disposed between the cover and the first plate and on which the piston plate is slidably displaced, the second plate being axially spaced from the cover and the first plate, wherein the first plate includes a first surface facing the second plate and the second plate includes a second surface facing the first plate; and, a rivet non-rotatably connecting the first plate to the second plate, the rivet being a component distinct from the first plate and the second plate, and the rivet includes a portion axially disposed between the first plate and the second plate and a portion in contact with the first surface and with the second surface, wherein:

the cover and the piston plate define at least a portion of a first pressure chamber;

the first plate and the second plate define at least a portion of a second pressure chamber; and, the first pressure chamber and the second pressure chamber are arranged to receive and expel a fluid to axially displace the piston plate to open and close the lock-up clutch.

* * * * *